(12) United States Patent
Umeda (10) Patent No.: US 9,030,680 B2
(45) Date of Patent: May 12, 2015

(54) INFORMATION PROCESSING APPARATUS, METHOD FOR CONTROLLING INFORMATION PROCESSING APPARATUS, AND PROGRAM

(75) Inventor: Yoshinobu Umeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/418,249

(22) Filed: Mar. 12, 2012

(65) Prior Publication Data

US 2012/0236347 A1 Sep. 20, 2012

(30) Foreign Application Priority Data

Mar. 15, 2011 (JP) .................................. 2011-056603

(51) Int. Cl.
*G06F 3/12* (2006.01)
*G06F 15/16* (2006.01)
*H04L 29/06* (2006.01)
*G06F 21/60* (2013.01)

(52) U.S. Cl.
CPC ............ *G06F 3/1238* (2013.01); *G06F 3/1212* (2013.01); *G06F 3/1221* (2013.01); *G06F 3/1222* (2013.01); *G06F 3/1229* (2013.01); *G06F 3/1279* (2013.01); *Y02B 60/1271* (2013.01); *G06F 21/608* (2013.01)

(58) Field of Classification Search
None
See application file for complete search history.

(56) References Cited

U.S. PATENT DOCUMENTS

| 2003/0212886 | A1* | 11/2003 | Sugiura ......................... | 713/150 |
| 2006/0101109 | A1* | 5/2006 | Nishio ........................... | 709/200 |
| 2008/0091736 | A1* | 4/2008 | Sawayanagi et al. ......... | 707/200 |
| 2010/0235619 | A1* | 9/2010 | Inoue ............................ | 713/151 |

FOREIGN PATENT DOCUMENTS

| JP | 2006-270538 A | 10/2006 |
| JP | 2010219605 A | 9/2010 |

* cited by examiner

*Primary Examiner* — Fred Guillermety
*Assistant Examiner* — Frantz Bataille
(74) *Attorney, Agent, or Firm* — Canon U.S.A., Inc. IP Division

(57) ABSTRACT

An information processing apparatus includes a control unit that, in a case where it is determined that proxy response processing should be performed, performs control such that an inputted job is processed without causing the information processing apparatus to transition from a second power mode to a first power mode, and, in a case where it is determined that proxy response processing should not be performed, performs control such that inputted job is processed after causing the information processing apparatus to transition from the second power mode to the first power mode.

8 Claims, 8 Drawing Sheets

| JOB TYPE | AVAILABILITY OF PROXY RESPONSE PROCESSING |
|---|---|
| APPARATUS STATUS CHECK | YES |
| NETWORK CONNECTION RESPONSE | YES |
| PDL PRINTING | NO |
| BOX REMOTE ACCESS | NO |

INFORMATION PROCESSING APPARATUS, METHOD FOR CONTROLLING INFORMATION PROCESSING APPARATUS, AND PROGRAM

BACKGROUND OF THE INVENTION

1. Field of the Invention

The present invention relates to an information processing apparatus, a method for controlling an information processing apparatus, and a program.

2. Description of the Related Art

Some information processing apparatuses have a normal mode and a power saving mode as a power mode, and operate in either power mode according to a situation. For such information processing apparatuses, it is important to increase the time period for which the information processing apparatus can operate in the power saving mode as much as possible to keep power consumption low.

Japanese Patent Application Laid-Open No. 2006-270538 discusses an invention relating to an information processing apparatus constituted by an apparatus main body and a network interface card (NIC), and configured in such a manner that power is supplied to the apparatus main body and the NIC in the normal mode, while power is supplied only to the NIC but is not supplied to the apparatus main body in the power saving mode. In this information processing apparatus, when a job is input during the power saving mode, the NIC performs proxy response processing, thereby maintaining the power saving mode of the information processing apparatus as long as possible.

The proxy response processing here means that, when a job is input during the power saving mode and this job is not required to be directly processed by the apparatus main body, the NIC processes this job on behalf of the apparatus main body while maintaining the power saving mode of the information processing apparatus. When a job is input during the power saving mode and this job is required to be directly processed by the apparatus main body, the information processing apparatus is transitioned from the power saving mode to the normal mode, thereby allowing the apparatus main body to directly process that job.

In recent years, it has become common to encrypt a job when the job is transmitted or received between a plurality of apparatuses for security reasons. If an encrypted job is input into and is processed by the information processing apparatus discussed in Japanese Patent Application Laid-Open No. 2006-270538, the following problem arises.

To apply proxy response processing to the encrypted job, the NIC side should decrypt the job first, and then perform proxy response processing. In this case, it can take a long time to decrypt the entire job, which inevitably leads to a delay in execution of proxy response processing. This problem becomes more noticeable when the decrypting capability of the NIC side is lower than the decrypting capability of the apparatus main body side.

SUMMARY OF THE INVENTION

One aspect of the present invention is directed to enabling proxy response processing perform processing more quickly on an encrypted job.

According to an aspect of the present invention, an information processing apparatus includes a first processing unit and a second processing unit. The information processing apparatus operates in a first power mode in which power is supplied to the first processing unit and the second processing unit, or in a second power mode in which power is not supplied to the first processing unit but is supplied to the second processing unit. The information processing apparatus includes an input unit configured to, when the information processing apparatus operates in the second power mode, input a job, a decryption unit configured to, when the input unit inputs an encrypted job, decrypt a header of the encrypted job without decrypting a main body of the encrypted job, a determination unit configured to determine whether the second processing unit should perform proxy response processing based on the header of the job, and a control unit configured to, in a case where the determination unit determines that the second processing unit should perform the proxy response processing, perform control such that the second processing unit processes the job input by the input unit without causing the information processing apparatus to transition from the second power mode to the first power mode, and configured to, in a case where the determination unit determines that the second processing unit should not perform the proxy response processing, perform control such that the first processing unit processes the job input by the input unit after causing the information processing apparatus to transition from the second power mode to the first power mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following description, an information processing apparatus is embodied by an MFP by way of example, but the information processing apparatus may be embodied by an apparatus that is not an MFP. Further, in the following description, an NIC is provided within the MFP, but the NIC may be provided outside the MFP.

Figure 1:
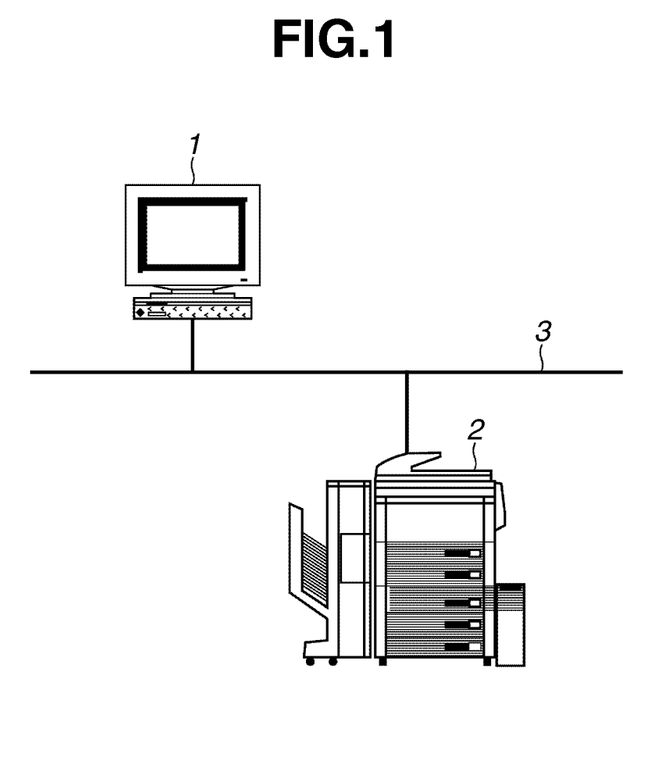
FIG. 1 illustrates a system configuration.

A first exemplary embodiment will be described. FIG. 1 illustrates a system configuration of the present exemplary embodiment.

A system includes a personal computer (PC) 1, an MFP 2, and a local area network (LAN) 3. The PC 1 generates a job, and then outputs the job to the MFP 2. The MFP 2 inputs a job from the PC 1, and then processes the job. The LAN 3 connects the PC 1 and the MFP 2 communicably to each other.

Figure 2:
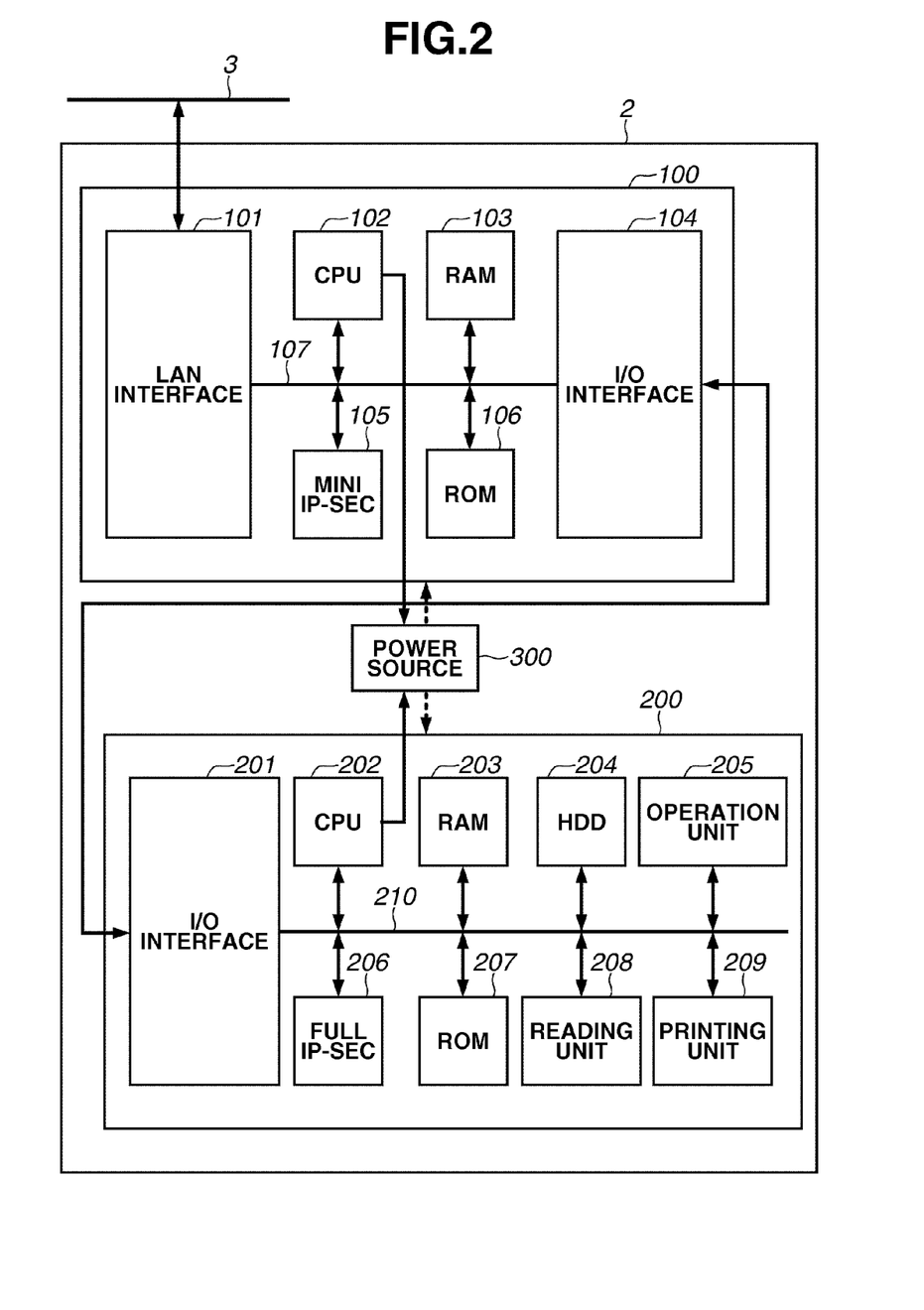
FIG. 2 is a block diagram illustrating the configuration of a multi-function peripheral (MFP) 2.

FIG. 2 is a block diagram illustrating the configuration of the MFP 2. In FIG. 2, the solid line indicates a data flow, and the broken line indicates a power flow.

The MFP 2 includes an NIC 100, an apparatus main body 200, and a power source 300. The NIC 100 includes components from a LAN interface 101 to a system bus 107. The LAN interface 101 inputs data from and outputs data to the LAN 3. A central processing unit (CPU) 102 (second processing unit) is in charge of control of the entire NIC 100. To realize this control, the CPU 102 reads out a program stored in a read only memory (ROM) 106 into a random access memory (RAM) 103, and then executes the program. The RAM 103 functions as, for example, a work area when the CPU 102 processes a job. An input/output (I/O) interface 104 inputs data from and outputs data into the apparatus main body 200.

A Mini Security Architecture for Internet Protocol (IP-Sec) 105 encrypts and decrypts data according to the IP-Sec method. The present exemplary embodiment will be described assuming that the Mini IP-Sec 105 is a hardware apparatus, but the Mini IP-Sec 105 may be a program described as a software application, and may be realized when the CPU 102 executes the program. The ROM 106 stores, for example, a program to be executed by the CPU 102. The system bus 107 connects the respective components of the NIC 100 to one another.

The apparatus main body 200 includes components from an I/O interface 201 to a system bus 210. The I/O interface 201 inputs data from and outputs data into the NIC 100. A CPU 202 (first processing unit) is in charge of control of the entire apparatus main body 200. To realize this control, the CPU 202 reads out a program stored in a ROM 207 or a hard disc drive (HDD) 204 into a RAM 203, and then executes the program.

The RAM 203 functions as, for example, a work area when the CPU 202 processes a job. The HDD 204 stores, for example, an operating system (OS) and an application program that the CPU 202 executes. Further, the HDD 204 can also hold image data input by the LAN interface 101 and a reading unit 208, and this image data can be output according to a user's instruction. A certain area in the storage area of the HDD 204 is designated to hold image data for a while, and this area is referred to as "BOX". Further, the function of storing image data into the BOX or outputting image data selected by a user from the image data stored in the BOX is referred to as "BOX function".

An operation unit 205 includes a display unit and an input unit. The operation unit 205 provides an operation screen of the MFP 2 to a user with use of the display unit, and receives various kinds of operations that a user applies to the MFP 2 with use of the input unit.

A Full IP-Sec 206 encrypts and decrypts data according to the IP-Sec method. The Full IP-Sec 2006 can encrypt and decrypt data more quickly than the Mini IP-Sec 105 does. Further, the Full-IP-Sec 206 consumes a larger amount of power than the Mini IP-Sec 105. Further, the Full IP-Sec 206 supports a wider range of encryption and decryption methods than the Mini IP-Sec 105.

The present exemplary embodiment will be described assuming that the Full IP-Sec 206 is a hardware apparatus, but the Full IP-Sec 206 may be a program described as a software application, and may be realized when the CPU 202 executes the program. The ROM 207 stores, for example, a boot program to be executed by the CPU 202.

The reading unit 208 reads a document to input image data and stores the image data into the RAM 203. A printing unit 209 prints data onto a sheet based on image data stored in the RAM 203.

A system bus 210 connects the respective components of the apparatus main body 200 to one another. A power source 300 supplies power to the NIC 100 and the apparatus main body 200. The power source 300 switches the operation mode of the MFP 2 between a normal mode and a power saving mode according to the control of the CPU 102 and the CPU 202.

Figure 3:
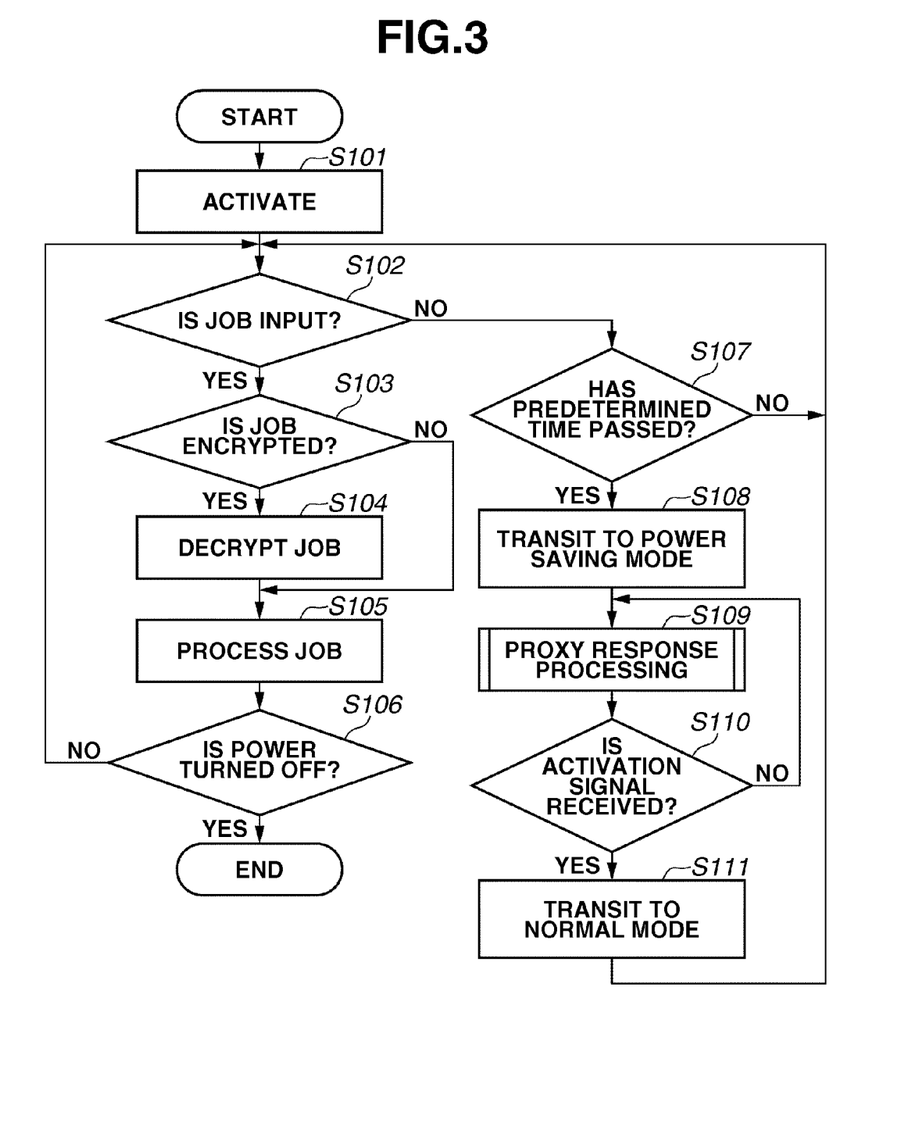
FIG. 3 is a flowchart illustrating processing to be performed by the MFP 2.

FIG. 3 is a flowchart illustrating the processing performed by the MFP 2. The processing illustrated in FIG. 3 is executed by the CPU 202 when the MFP 2 operates mainly in the normal mode. The CPU 202 reads out the program stored in the HDD 204 into the RAM 203 to execute the program, so that the processing illustrated in FIG. 3 is realized.

First, in step S101, the CPU 202 activates the MFP 2 when the CPU 202 receives an instruction to turn the power on from a user via the operation unit 205. Upon completion of the activation, the MFP 2 starts operating in the normal mode. In the present exemplary embodiment, the MFP 2 operates in any of a plurality of power modes. Examples of the plurality of power modes include the normal mode (first power mode) and the power saving mode (second power mode). The normal mode is a power mode in which power is supplied to both the NIC 100 and the apparatus main body 200.

The power saving mode is a power mode in which power consumption is low compared to the normal mode, and power is supplied to the NIC 100 but is not supplied to the apparatus main body 200. Further, as the power saving mode, there may be a power mode in which power supply is stopped to only a part of the apparatus main body 200 (the operation unit 205, the reading unit 208, and the printing unit 209), and power supply is continued to the rest of the apparatus main body 200. In the present embodiment, the expression "power is not supplied" should be interpreted in abroad sense, and is intended to cover not only the condition that no power is supplied power, but also the condition that the supplied power is too low to allow execution of a normal operation.

Subsequently, in step S102, the CPU 202 determines whether a job is input via the I/O interface 201. If a job is input (YES in step S102), the processing proceeds to step S103. If no job is input (NO in step S102), the processing proceeds to step S107.

If the determination result is YES in step S102, in step S103, the CPU 202 determines whether the job input in step S102 is encrypted. If the input job is encrypted (YES in step S103), the processing proceeds to step S104. If the input job is not encrypted (NO in step S103), the processing proceeds to step S105.

Subsequently, in step S104, the CPU 202 decrypts the job input in step S102 by controlling the Full IP-Sec 206. For an input job entirely encrypted, the Full IP-Sec 206 entirely decrypts the input job. For an input job partially encrypted, the Full IP-Sec 206 partially decrypts the input job.

Subsequently, in step S105, the CPU 202 processes the job input in step S102. At this time, the CPU 202 performs the processing according to the type of the input job.

Subsequently, in step S106, the CPU 202 determines whether the CPU 202 has received an instruction to turn the power off from the user via the operation unit 205. If the CPU 202 has received an instruction to turn the power off from the user (YES in step S106), the processing ends. If the CPU 202 has not received an instruction to turn the power off from the user (NO in step S106), the processing proceeds to step S102.

If the determination result is NO in step S102, in step S107, the CPU 202 determines whether a predetermined time has passed, maintaining such a state that no job is input via the LAN interface 101. Alternatively, in step S107, instead of making the above-described determination, the CPU 202 determines whether the CPU 202 has received an instruction to cause the MFP 207 to transit to the power saving mode from the user via the operation unit 205. If the predetermined time has passed, maintaining such a state that no job is input (YES in step S107), the processing proceeds to step S108. If the predetermined time has not passed, maintaining such a stat that no job is input (NO in step S107), the processing proceeds to step S102.

Subsequently, in step S108, the CPU 202 controls the power source 300 to cause the MFP 2 transition from the normal mode to the power saving mode. In step S109, during the power saving mode, the NIC 100 performs proxy response processing. The proxy response processing means that the CPU 102 responds to a job on behalf of the CPU 202 while the MFP 2 is operating in the power saving mode. The details of step S109 is described below with reference to FIG. 4.

Subsequently, in step S110, the CPU 202 determines whether the CPU 202 has received an activation signal from the CPU 102 via the I/O interface 201. The activation signal is a signal transmitted from the CPU 102 to the CPU 202, and a signal for causing the MFP 2 to transition from the power saving mode to the normal mode. It should be noted that, immediately before the CPU 202 receives an activation signal, the CPU 102 controls the power source 300, thereby arranging power to be supplied to at least the CPU 202. Alternatively, in step S110, instead of making the above-described determination, the CPU 202 determines whether the CPU 202 has received an instruction to cause the MFP 2 to transition to the normal mode from the user via the operation unit 205. If the CPU 202 has received an activation signal from the CPU 102 (YES in step S110), the processing proceeds to step S111. If the CPU 202 has not received an activation signal from the CPU 102 (NO in step S110), the processing proceeds to step S109.

Subsequently, in step S111, the CPU 202 controls the power source 300 to cause the MFP 2 to transition from the power saving mode to the normal mode. The processing of causing the MFP 2 to transition from the power saving mode to the normal mode includes, for example, the processing that the CPU 202 activates the respective components of the apparatus main body 202.

Figure 4:
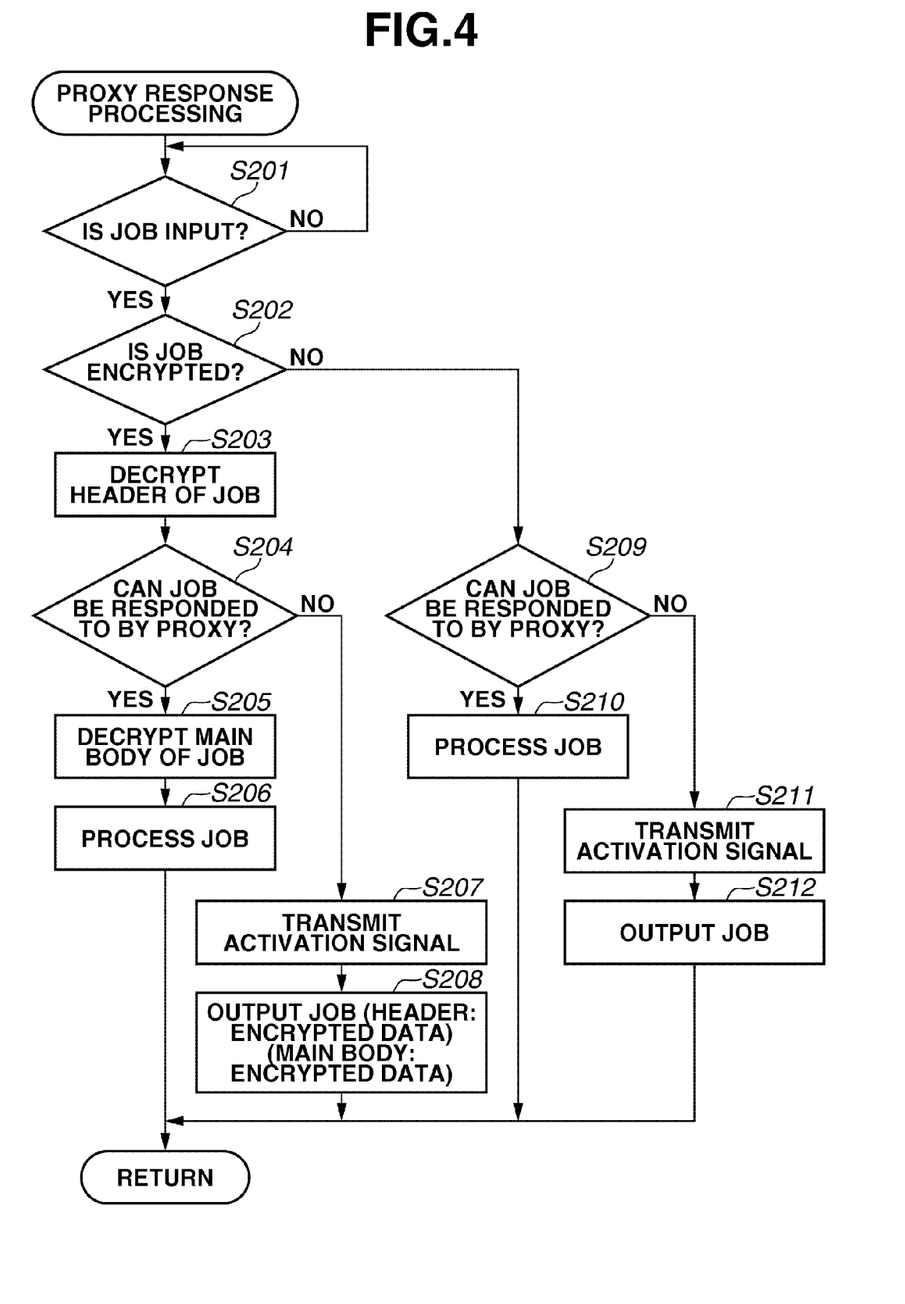
FIG. 4 is a flowchart illustrating the details of proxy response processing according to a first exemplary embodiment.

FIG. 4 is a flowchart illustrating the details of the proxy response processing according to the first exemplary embodiment. The processing illustrated in FIG. 4 is performed by the CPU 102 when the MFP 2 operates mainly in the power saving mode. The CPU 102 reads out the program stored in the ROM 106 into the RAM 103 to execute the program, so that the processing illustrated in FIG. 4 is realized.

First, in step S201, the CPU 102 determines whether a job is input via the LAN interface 101. If a job is input (YES in step S201), the processing proceeds to step S202. If no job is input (NO in step S201), the CPU 102 waits until a job is input.

Subsequently, in step S202, the CPU 102 determines whether the job input in step S201 is encrypted. If the input job is encrypted (YES in step S202), the processing proceeds to step S203. If the input job is not encrypted (NO in step S202), the processing proceeds to step S209.

If the determination result is YES in step S202 in step S203, the CPU 102 controls the Mini IP-Sec 105 to decrypt the header of the job input in step S201. At this time, the Mini IP-Sec 105 does not decrypt the main body of the job. Further, at this time, the header of the job is copied to the Mini IP-Sec 105, which then decrypts this copy. Therefore, the original header of the job remains encrypted.

Figure 5:
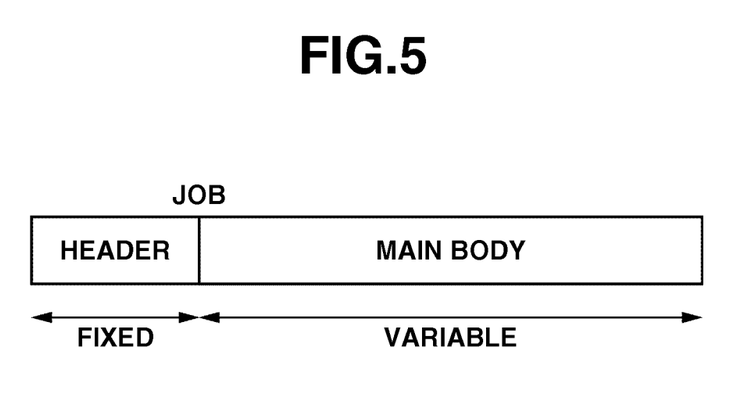
FIG. 5 illustrates a data structure of a job.

FIG. 5 illustrates a data structure of a job. A job includes a header and a main body. The header contains, for example, information indicating the type of the job, and the main body contains, for example, image data required to execute the job. The header has a fixed data length, while the main body has a variable data length. In step S203, the Mini IP-Sec 105 decrypts data from the beginning of the job to the position corresponding to a predetermined data length, thereby decrypting the header of the job.

Subsequently, in step S204, the CPU 102 determines whether the job input in step S201 is a job that the NIC 100 can respond to by proxy based on the information indicating the type of the job, which is contained in the header of the job decrypted in step S203. If the input job is a job that the NIC 100 can respond to by proxy (YES in step S204), the processing proceeds to step S205. If the input job is not a job that the NIC 100 can respond to by proxy (NO in step S204), the processing proceeds to step S207.

In the present exemplary embodiment, the MFP 2 can process a plurality of types of jobs. Examples of the plurality of types of jobs, especially, examples of jobs input from the PC 1 to the MFP 2, include an apparatus status check, a network connection response, Page Description Language (PDL) printing, and BOX remote access. The apparatus status check job is where the MFP 2 reports the current status of the MFP 2 (for example, presence or absence of an error, the remaining amount of toner, and the remaining amount of sheets) to the PC 1 in response to a request from the PC 1. The network connection response job is where the MFP 2 notifies the PC 1 that the MFP 2 is connected to the LAN 3 at that time in response to a request from the PC 1. The PDL printing job is where the MFP 2 controls the printing unit 209 to print data based on print data in the PDL format which is input from the PC 1.

The BOX remote access job is where the BOX is accessed by a remote operation from the PC 1. Examples of jobs that remotely access the BOX include a job of storing image data into the BOX according to a remote operation from the PC 1, and a job of printing data based on image data stored in the BOX according to a remote operation from the PC 1.

Figure 6:
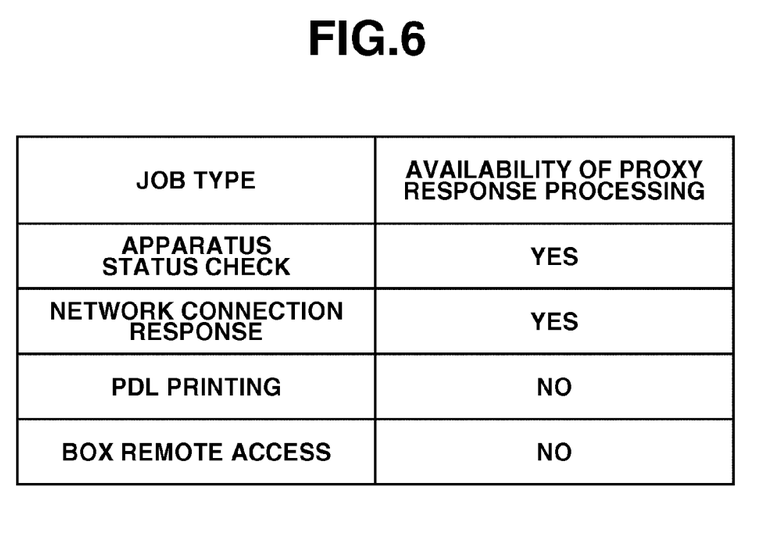
FIG. 6 is a table storing the correspondence relationship between job types and availability of the proxy response processing.

FIG. 6 is a table indicating the correspondence relationship between job types and availability of proxy response processing. This table is stored in the ROM 106, and can be used by the CPU 102. For example, the apparatus status check and network connection response jobs can be processed without use of the components of the apparatus main body 200, and thereby allow the NIC 100 to take care of them by proxy response processing.

Further, for example, the PDL printing and BOX remote access jobs cannot be processed without use of the components of the apparatus main body 200, and thereby do not allow the NIC 100 to take care of them by proxy response processing. In step S204, the CPU 102 refers to the table illustrated in FIG. 6 to specify availability of proxy response processing from the job type, and thereby determines whether the input job is a job that the NIC 100 can respond to by proxy response processing.

If the determination result is YES in step S204, in step S205, the CPU 102 controls the Mini IP-Sec 105 to decrypt the main body of the job input in step S201. At this time, the CPU 102 does not decrypt the header of the input job.

Subsequently, in step S206, the CPU 102 processes the job input in step S201. At this time, the CPU 102 performs the processing according to the type of the input job based on the information indicating the job type which is contained in the job header decrypted in step S203. Further, at this time, the CPU 102 processes the input job with use of the data contained in the job main body decrypted in step S205.

If the determination result is NO in step S204, in step S207, the CPU 102 transmits an activation signal to the CPU 202 via the I/O interface 104.

Subsequently, in step S208, the CPU 102 transmits the job input in step S201 to the apparatus main body 200 via the I/O interface 104. In the present exemplary embodiment, in step S208, the CPU 102 does not overwrite the header and main body of the job with the decrypted data, and therefore both the header and main body of the job transmitted to the apparatus main body 200 are data remaining encrypted.

If the determination result is NO in step S202, in step S209, the CPU 102 determines whether the job input in step S201 is a job that the NIC 100 can respond to by proxy response processing based on the information indicating the job type contained in the header of the job input in step S201. In step S209, the CPU 102 also refers to the table illustrated in FIG. 6 to specify availability of proxy response processing from the job type, and thereby determines whether the input job is a job that the NIC 100 can respond to by proxy response processing. If the input job is a job that the NIC 100 can respond to by proxy response processing (YES in step S209), the processing proceeds to step S210. If the input job is not a job that the NIC 100 can respond to by proxy response processing (NO in step S209), the processing proceeds to step S211.

If the determination result is YES in step S209, in step S210, the CPU 102 processes the job input in step S201. At this time, the CPU 102 performs the processing according to the type of the input job based on the information indicating the job type, which is contained in the header of the job input in step S201. Further, at this time, the CPU 102 processes the input job with use of the data contained in the main body of the job input in step S201.

If the determination result is NO in step S209, in step S211, the CPU 102 transmits an activation signal to the CPU 202 via the I/O interface 104.

Subsequently, in step S212, the CPU 102 transmits the job input in step S201 to the apparatus main body 200 via the I/O interface 104. Step S212 is performed after the CPU 202 has completed its activation in response to the activation signal. Further, in the job data transmitted to the apparatus main body 200 in step S212, both the header and main body are unencrypted data.

According to the present exemplary embodiment, when an encrypted job is input while the MFP 2 is operating in the power saving mode, the NIC 100 decrypts only the header of the job to determine availability of proxy response processing. As a result, the NIC 100 can perform proxy response processing on the encrypted job at a higher speed and with a lighter processing load, compared to the processing speed and load when the NIC 100 decrypts the entire job to determine availability of proxy response processing.

A second exemplary embodiment will now be described. According to the first exemplary embodiment, in step S208, the NIC 100 transmits a job containing both the header and main body remaining encrypted to the apparatus main body 200.

Figure 7:
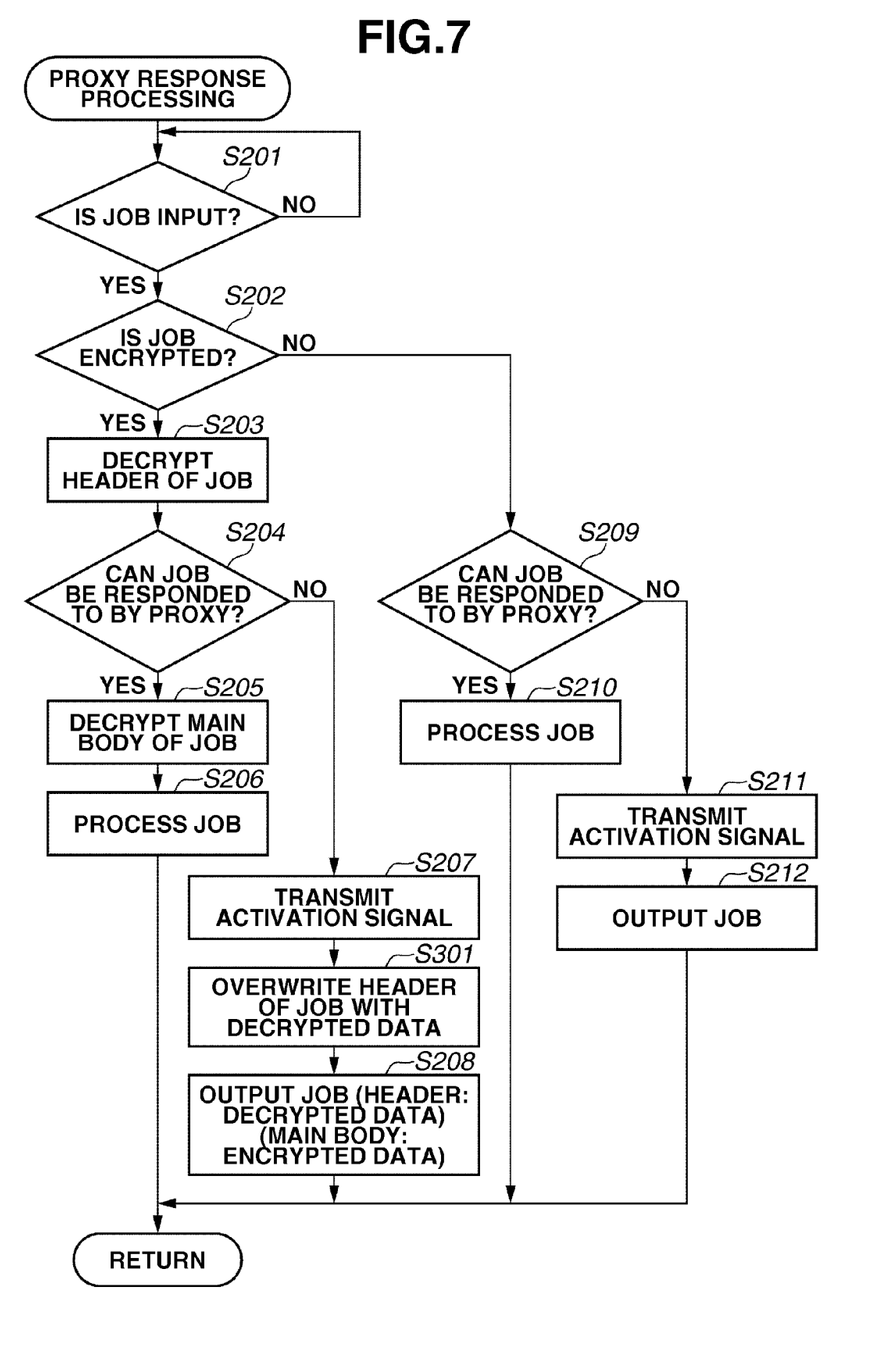
FIG. 7 is a flowchart illustrating the details of proxy response processing according to a second exemplary embodiment.

According to the second exemplary embodiment, in step S208, the NIC 100 transmits a job in which the header is decrypted and the main body remains encrypted, to the apparatus main body 200.

The basic configuration of the present exemplary embodiment is similar to the first exemplary embodiment described with reference to FIGS. 1 to 6, and therefore the description thereof will be omitted here.

FIG. 7 is a flowchart illustrating the details of the proxy response processing according to the second exemplary embodiment. In FIG. 7, steps similar to those illustrated in FIG. 4 are indicated by the same step numbers, and the descriptions thereof will be omitted here. A difference between FIG. 7 and FIG. 4 is the addition of step S301 between step S207 and step S208. In step S301, the CPU 102 overwrites the header of the job input in step S201 with the data decrypted in step S203. As a result of the execution of step S301, in step S208, the CPU 102 outputs the job data with only the header thereof decrypted. Therefore, in step S104, the CPU 202 only has to decrypt the main body of the job.

Alternatively, the present exemplary embodiment may be configured in such a manner that overwriting the header of a job is performed only when the time required to cause the MFP 2 to transit from the power saving mode to the normal mode is longer than the time required to overwrite the header of the job. In this case, the time required for the MFP 2 to transition from the power saving mode to the normal mode, and the time required to overwrite the header of the job are stored in advance or estimated each time.

According to the present exemplary embodiment, when an encrypted job is input while the MFP 2 is operating in the power saving mode, and the MFP 2 transitions to the normal mode, the job transmitted from the NIC 100 to the apparatus main body 200 already has a decrypted header. As a result, according to the present exemplary embodiment, the CPU 202 does not have to decrypt the header of the job after the MFP 2 transitions to the normal mode, so that the CPU 202 can process the job at a higher speed and with a lighter processing load compared to the first exemplary embodiment.

A third exemplary embodiment will now be described. According to the first exemplary embodiment, in step S208, the NIC 100 transmits a job with both the header and main body thereof remaining encrypted to the apparatus main body 200.

According to the third exemplary embodiment, in step S208, the NIC 100 transmits a job in which both the header and the main body are decrypted to the apparatus main body 200. The basic configuration of the present exemplary embodiment is similar to the first exemplary embodiment described with reference to FIGS. 1 to 6, and therefore the description thereof will be omitted here.

Figure 8:
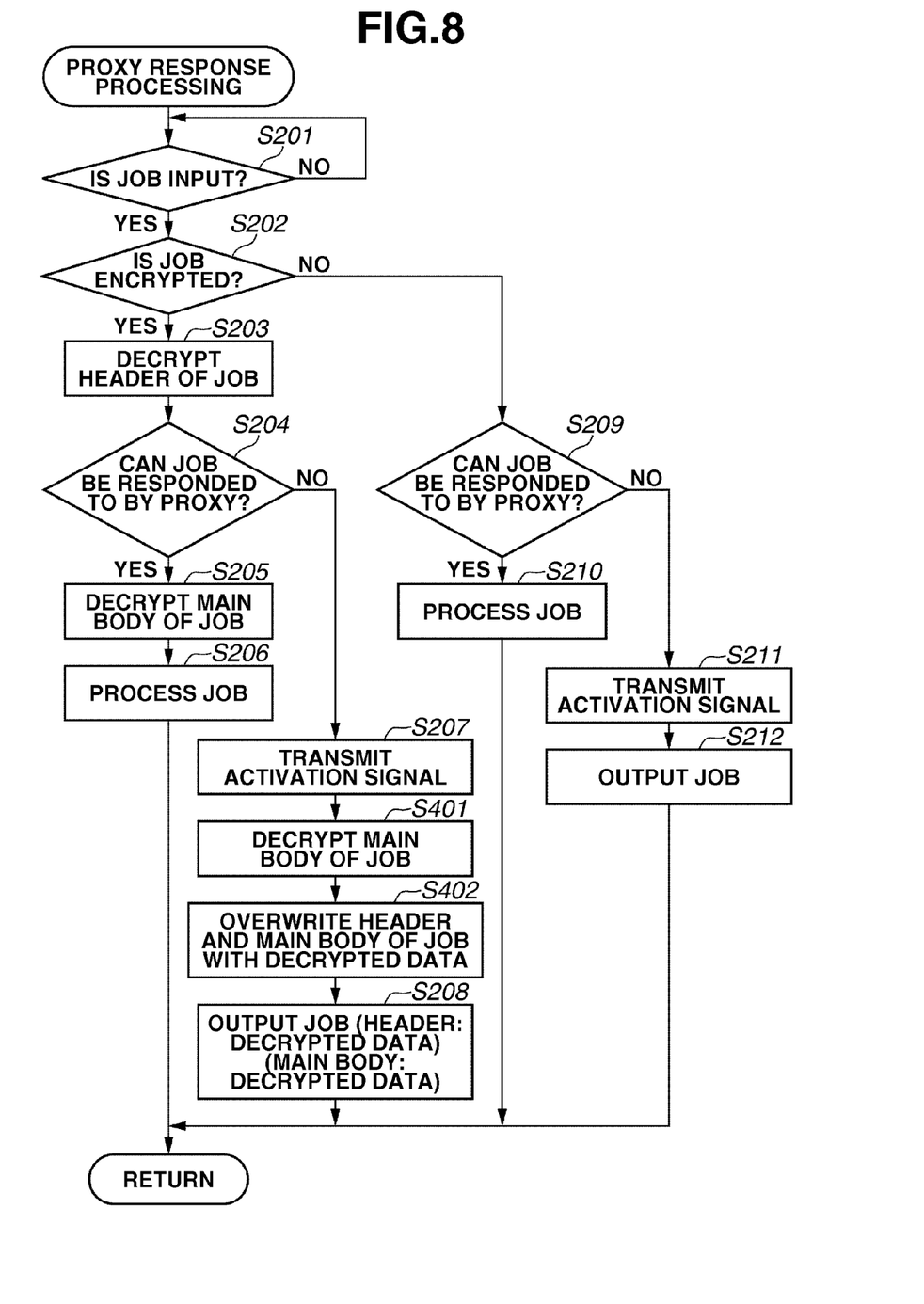
FIG. 8 is a flowchart illustrating the details of proxy response processing according to a third exemplary embodiment.

FIG. 8 is a flowchart illustrating the details of the proxy response processing according to the third exemplary embodiment. In FIG. 8, steps similar to those in FIG. 4 are indicated by the same step numbers, and the descriptions thereof will be omitted here. A difference between FIG. 8 and FIG. 4 is the addition of steps S401 and S402 between steps S207 and S208.

First, in step S401, the CPU 102 controls the Mini IP-Sec 105 to decrypt the main body of the job input in step S201. At this time, the main body of the job is copied to the Mini IP-Sec 105, which then decrypts this copy. Therefore, the original main body of the job remains encrypted.

Subsequently, in step S402, the CPU 102 overwrites the header of the job input in step S201 with the data decrypted in step S203, and overwrites the main body of the job input in step S201 with the data decrypted in step S401. As a result of the execution of step S402, in step S208, the CPU 102 outputs the job data with both the header and main body thereof decrypted. Therefore, in step S104, the CPU 202 does not have to decrypt the job.

Alternatively, the present exemplary embodiment may be configured in such a manner that decrypting and overwriting the main body of a job is performed only when the time required for the MFP 2 to transition from the power saving mode to the normal mode is longer than the time required to decrypt and overwrite the main body of the job. In this case, the time required for the MFP 2 to transition from the power saving mode to the normal mode, and the time required to decrypt and overwrite the main body of the job are stored in advance or estimated each time.

According to the present exemplary embodiment, when an encrypted job is input while the MFP 2 is operating in the power saving mode, and the MFP 2 transitions to the normal mode, the job transmitted from the NIC 100 to the apparatus main body 200 already has a decrypted header and main body. As a result, according to the present exemplary embodiment, the CPU 202 does not have to decrypt the header and main body of the job after the power mode of the MFP 2 is caused to transit to the normal mode, so that the CPU 202 can process the job at a higher speed and with a lighter processing load compared to the first exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-056603 filed Mar. 15, 2011, which is hereby incorporated by reference herein in its entirety.

What is claimed is:

1. An information processing apparatus including a first processing unit, a first decryption unit, a second processing unit, and a second decryption unit,
wherein the information processing apparatus operates in a first power mode in which power is supplied to the first processing unit and the second processing unit or in a second power mode in which power is not supplied to the first processing unit but is supplied to the second processing unit,
wherein an ability of decryption by the first decryption unit is higher than an ability of decryption by the second decryption unit,
wherein the apparatus comprising:
an input unit configured to, when the information processing apparatus operates in the second power mode, input a job which includes a header and a main body, the header being encrypted and the main body being encrypted,
wherein the second decryption unit, decrypts the header of the job without decrypting the main body of the job,
wherein the second processing unit determines whether to perform proxy response processing based on the decrypted header of the job, and
wherein, in a case where it is determined that the second processing unit should perform the proxy response processing, the second decryption unit decrypts the main body of the job and the second processing unit processes the job based on the decrypted main body without causing the information processing apparatus to transition from the second power mode to the first power mode, and in a case where the it is determined that the second processing unit should not perform the proxy response processing, the first decryption unit decrypts the main body of the job and the first processing unit processes the job based on the decrypted main body after causing the information processing apparatus to transition from the second power mode to the first power mode.

2. The information processing apparatus according to claim 1, wherein the second processing unit is configured to, in a case where it is determined that the second processing unit should not perform the proxy response processing, transmit the job input by the input unit to the first processing unit, and
wherein the first processing unit is configured to process the job.

3. The information processing apparatus according to claim 2, wherein the second processing unit is configured to transmit the job to the first processing unit with the header and the main body thereof remaining encrypted, and
wherein the first decryption unit is configured to decrypt the header and the main body to process the job.

4. The information processing apparatus according to claim 2, wherein the second processing unit is configured to transmit the job to the first processing unit with the header thereof decrypted and the main body thereof remaining encrypted, and
wherein the first decryption unit is configured to decrypt the main body of the job without decrypting the header to process the job.

5. The information processing apparatus according to claim 2, wherein the second decryption unit is configured to decrypt the main body of the job based on a time period required for the information processing apparatus transitioning from the second power mode to the first power mode and a time period required to decrypt the main body,
wherein the second processing unit is configured to transmit the job to the first processing unit with the header and the main body thereof decrypted, and
wherein the first decryption unit is configured not to decrypt the header and the main body of the job.

6. A method for controlling an information processing apparatus including a first processing unit, a first decryption unit, a second processing unit, and a second decryption unit,
wherein the information processing apparatus operates in a first power mode in which power is supplied to the first processing unit and the second processing unit or in a second power mode in which power is not supplied to the first processing unit but is supplied to the second processing unit, and wherein an ability of decryption by the first decryption unit is higher than an ability of decryption by the second decryption unit, the method comprising:

inputting, when the information processing apparatus operates in the second power mode, a job which includes a header and a main body, the header being encrypted and the main body being encrypted;

decrypting the header of the job without decrypting the main body of the job;

determining whether the second processing unit should perform proxy response processing based on the decrypted header of the job; and in a case where it is determined that the second processing unit should perform the proxy response processing, the second decryption unit decrypts the main body of the job and the second processing unit processes the job based on the decrypted main body without causing the information processing apparatus to transition from the second power mode to the first power mode, and in a case where it is determined that the second processing unit should not perform the proxy response processing, the first decryption unit decrypts the main body of the job and the first processing unit processes the job based on the decrypted main body after causing the information processing apparatus to transition from the second power mode to the first power mode.

7. A non-transitory computer-readable storage medium storing a program for causing an information processing apparatus to implement the method of claim 6.

8. The information processing apparatus according to claim 1, wherein the job input by the input unit is a job encrypted according to IP-sec method.

* * * * *